Sept. 4, 1923.
G. P. MIX
1,467,056
LAND PULVERIZER AND MULCHER
Original Filed April 10, 1920    2 Sheets-Sheet 1
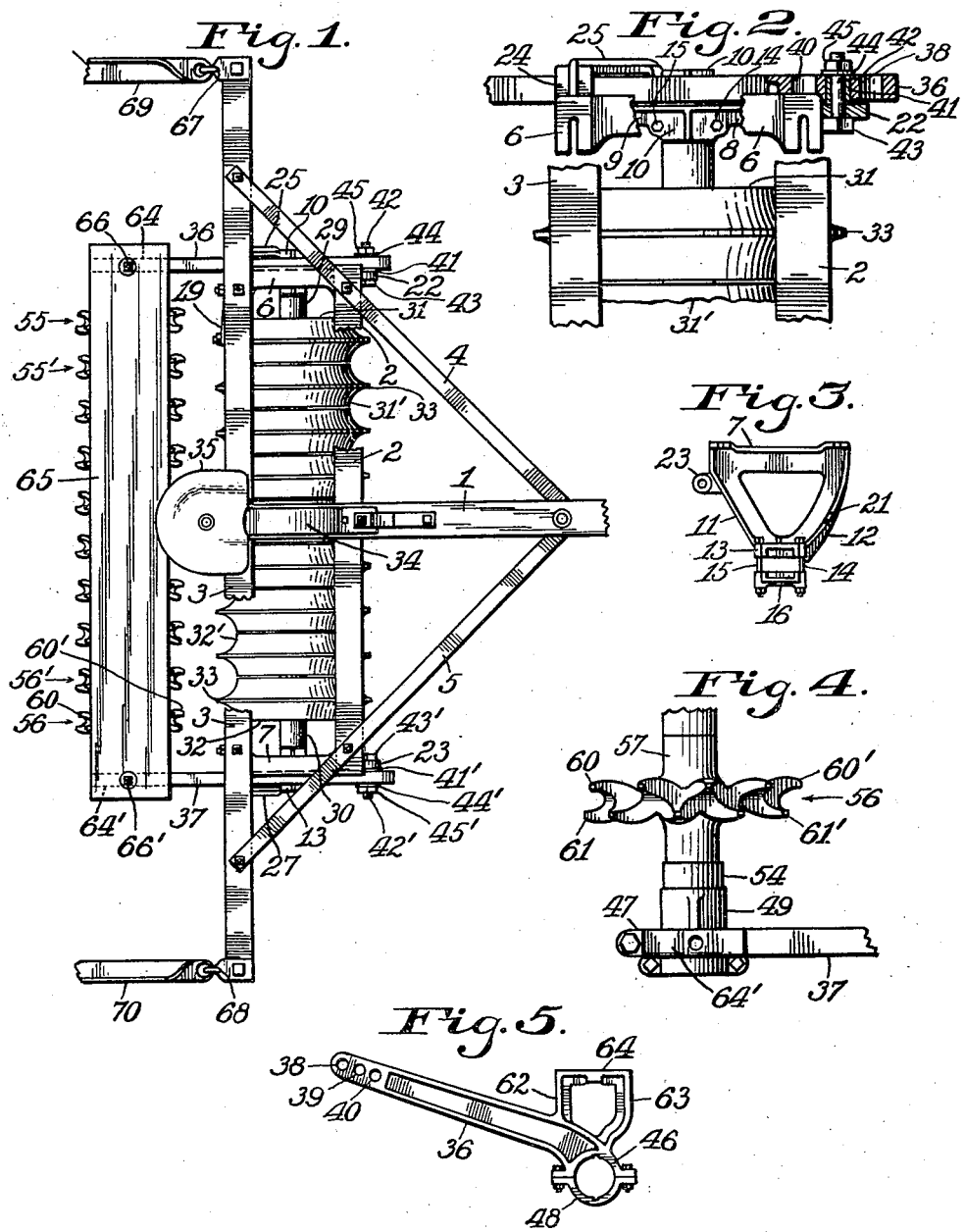
WITNESS:
Ed J. Clark
F. M. Roeder
INVENTOR:
Gainford P. Mix,
BY
E. T. Silvius,
ATTORNEY.

Sept. 4, 1923.  
G. P. MIX  
LAND PULVERIZER AND MULCHER  
Original Filed April 10, 1920   2 Sheets-Sheet 2
1,467,056
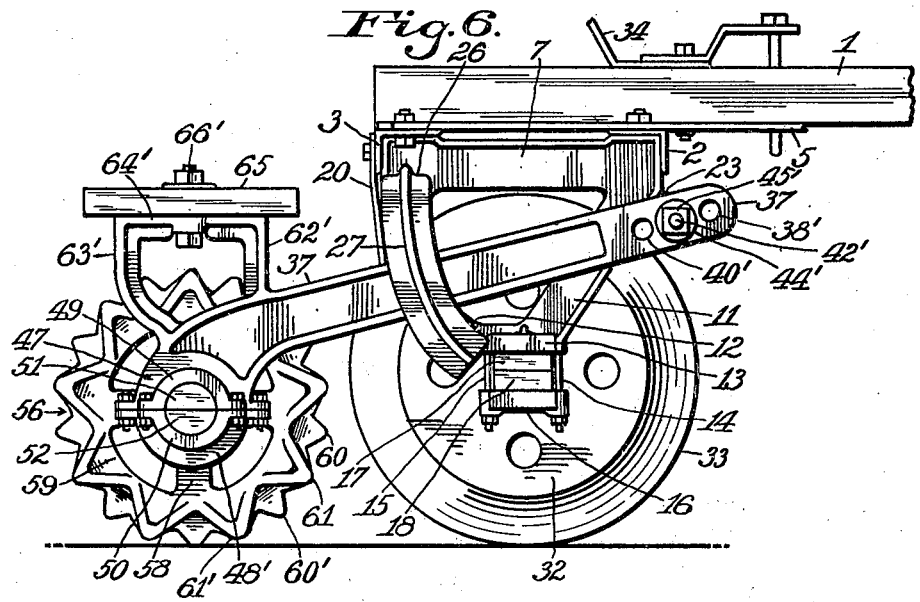
WITNESS:  
Ed J. Clark  
F. M. Roeder
INVENTOR:  
Gainford P. Mix,  
BY  
E. T. Silvius,  
ATTORNEY.

Patented Sept. 4, 1923.

1,467,056

UNITED STATES PATENT OFFICE.

GAINFORD P. MIX, OF MOSCOW, IDAHO.

LAND PULVERIZER AND MULCHER.

Application filed April 10, 1920, Serial No. 372,958. Renewed March 26, 1923.

*To all whom it may concern:*

Be it known that I, GAINFORD P. MIX, a citizen of the United States, residing at Moscow, in the county of Latah and State of Idaho, have invented a new and useful Improvement in a Land Pulverizer and Mulcher, of which the following is a specification, reference being had to the accompanying drawings and to the letters and figures of reference marked thereon.

This invention relates to an implement for preparing ground for crops or for working and improving the surface of ground or soil when desired, the invention having reference more particularly to an implement that is designed to level and pulverize farming land and to immediately mulch the land or soil.

An object of the invention is to provide an improved mulcher which shall be so constructed as to be capable of great efficiency in operation, and not be liable to become clogged with the soil so as to impair the efficiency of the mulcher.

Another object is to provide an improved land pulverizer and mulcher which shall be so constructed as to permit the mulcher frame to be adjustable so as to be freely movable up or down relatively to the pulverizer frame on uneven ground, and to permit the mulcher frame to be adjusted relatively to the pulverizer frame so that the mulcher wheels may be brought closer to the pulverizer roller or wheels, as may be required under different conditions.

A further object is to provide an improved toothed mulcher wheel which shall be so constructed as to be capable of working the soil to a uniform depth without liability of sinking undesirably deep in the soil, and which when used in a series shall be capable of leaving the ground in the uniform condition behind the mulcher wheels.

A further and more specific object is to provide improved means for connecting a mulcher frame with a pulverizer frame, and especially so as to provide a great distance between the mulcher wheel shaft and the pivotal center whereby the mulcher frame is connected to the pulverizer frame, and without locating the mulcher wheels at a great distance from the pulverizer wheels or roller, while permitting great freedom of action of the mulcher on rough ground and insuring uniform weight of the mulcher upon the ground.

With the above-mentioned and other objects in view, the invention consists in a pulverizer frame of improved construction, a mulcher frame of improved construction and improved means for connecting the mulcher frame with the pulverizer frame; and, the invention consists also further in a novel mulcher wheel, and in the parts and combinations and arrangements of parts as hereinafter particularly described and further defined in the accompanying claims.

Referring to the drawings,—Figure 1 is a top plan of a land pulverizer and mulcher constructed substantially in accordance with the invention, portions being broken away for a clear view of other portions; Fig. 2 is a fragmentary top plan showing portions of the preceding figure on an enlarged scale; Fig. 3 is an elevation of one of the two end parts of the pulverizer frame; Fig. 4 is a fragmentary top plan of the mulcher frame and showing particularly the improved mulcher wheel; Fig. 5 is a side elevation of one of the two side parts of the mulcher frame; Fig. 6 is a side elevation of the improved pulverizer and mulcher on an enlarged scale; Fig. 7 is a fragmentary vertical section of the mulcher; and, Fig. 8 is a fragmentary vertical section of the pulverizer structure.

Similar reference characters in the different figures of the drawings indicate corresponding elements or features of construction as herein referred to in detail.

As preferably constructed the implement comprises a pole or tongue 1 whereby to pull and guide the implement, transverse frame beams 2 and 3 secured to the pole, and angle braces 4 and 5 secured to the pole and to the forward beam 2. When the structure is designed to constitute the main one of a plurality of implements or sections, the rearward one of the frame beams is longer than the forward beam and the extended portions thereof are secured to the braces respectively, in such case the braces being extended the required distance, the ends of the rearward beam being adapted to pull other pulverizers and mulchers or sections similar to the main implement section of a system. The pulverizer frame comprises also two roller frames which have base portions 6 and 7 respectively secured to the main frame beams 2 and 3. One roller frame has legs 8 and 9 extending from the base portion and a housing portion 10 connected to the legs; and the companion roller frame has similar legs 11 and 12 and a housing portion 13. Each housing portion is provided with clamp bolts 14 and 15 to which a housing cap 16 is connected to secure journal box parts 17 and 18 thereto. Preferably two angle braces 19 and 20 are secured to the rearward frame beam 3 and to the rearward leg of the roller frames respectively, each leg preferably having a projecting ear 21 to which the brace is directly secured. The forward portion of one roller frame has a lug ear 22 and the forward portion of the companion roller frame has a similar lug ear 23 thereon, the lug ears preferably projecting forward from the forward legs of the roller frame. The outer side of the base portion 6, adjacent to the leg 9, has an outward extending guide shoulder 24 to which a curved guide 25 is connected that extends opposite to the rearward leg 9 and is connected to the housing portion 10, so that the rearward leg is adapted to constitute a guide bar. Similarly the base portion 7 of the companion frame has a shoulder 26 thereon to which a guide bar 27 is connected that extends downward opposite to the rearward leg 12 and is connected to the housing part 13, so that the leg 12 is adapted to constitute a guide bar. A roller shaft 28 is mounted in the journal boxings that are in the two roller frames, the shaft preferably having collars 29 and 30 thereon adjacent to the journal boxings. Pulverizer rollers or wheels 31 and 32 and other similar rollers or wheels 31', 32', are mounted side by side on the roller shaft, and each roller or wheel has a circumferential rib 33 thereon adapted for crushing or breaking up clods, so that the soil shall be not only rolled evenly but pulverized by the land roller formed of the series of rollers or wheels. The pole or tongue has a suitable seat spring 34 thereon which supports a seat 35 for the driver or operator.

The mulcher frame comprises two arms 36 and 37, one arm being arranged between the leg 9 and the guide bar 25, the other arm being arranged between the leg 12 and the guide bar 27 and extending to the outer side of the lug ears 22 and 23 respectively. The forward portion of one arm has pivot holes 38, 39, 40, therein, the remaining arm similarly having pivot holes 38', 40', therein, and bushings 41, 41', are provided which are insertable loosely into either one of the pivot holes, the bushing being slightly longer than the hole. The bushings are tightly secured to the outer side of the lug ears 22 and 23 respectively by means of pivot bolts 42 and 42' having heads 43 and 43' respectively, washers 44 and 44' on the bolts against the outer end of the bushings respectively, and nuts 45 and 45' on the bolts and against the washers, so that strong pivots are provided for the arms of the mulcher frame. The arms being pivoted on the forward portions of the pulverizer frame, have a long reach rearward over the pulverizer shaft and beyond the rearward portion of the pulverizer frame. The arms 36 and 37 have housing members 46 and 47 respectively on their rearward ends to which caps 48 and 48' are respectively secured. Each of the housings contain boxing parts 49 and 50 in which bearing members 51 and 52 are embraced. A mulcher shaft 53 is mounted in the bearing members of the two frame arms and preferably has collars 54 adjacent to the boxings. A suitable number of mulcher wheels, 55, 55', 56, 56' are arranged on the mulcher shaft 53. Each mulcher wheel has a long hub 57 and a web or spokes 58 and also a rim 59 which is of suitable width to afford support for the wheel on the ground. The rim has a series of teeth or projections 60, 60' that extend radially from one edge of the rim and another series of teeth or projections 61, 61' that extend radially from the opposite edge of the rim, all the teeth or projections being pointed. The teeth in each series are spaced equi-distant apart, and the teeth of each series are in non-opposite arrangement relatively to the teeth of the opposite series, the teeth of the two series thus being in staggered arrangement so as to not be liable to hold the soil between them but enabling the wheel to have a broad range of action and thoroughly work the maximum amount of surface of the soil.

The arm 36 has standards 62 and 63 thereon above the housing portion 46 and a seat bar 64 on the top of the standards; and the arm 37 has standards 62' and 63' and the seat bar 64', the seat bars supporting a weight plank 65 which is secured to the seat bars by bolts 66 and 66', respectively. Suitable weight elements, as will be understood, may be carried upon the weight plank 65 to enable the mulcher wheels to properly work the soil, the amount of weight being varied according to the condition of the soil or the results desired.

When it is desired to draw other sections so as to pulverize and mulch a broad area at one operation, the frame beam 3 is provided at its ends with hooks 67 and 68 to which suitable tongues or draft poles 69 and 70 of the trailing implements are respectively connected.

In practical use the power to pull the pulverizer and mulcher ahead is hitched to the pole or tongue 1, and as the implement is moved forward the land roller, which practically is grooved, pulverizes and levels the soil and is followed by the mulcher which thoroughly mulches or works the soil. The mulcher wheel shaft is arranged at the minimum distance permissible back of the roller shaft, so that the implement may be readily turned at the ends of fields, and the arms of the mulcher frame being very long permits the mulcher to freely rise or fall on the uneven ground; and if the pole 1 be depressed at its end the pulverizer frame is tilted until the arms of the mulcher frame may be lifted by contact with the top of the housing portions 10 and 13, so that the mulcher may be carried by the pulverizer frame free from the ground, as may be desirable when turning at the ends of a field. When desired the effective length of the mulcher frame arms may be adjusted by shifting the pivot bolts to different pivot holes in the arms.

Having thus described the invention, what is claimed as new is—

1. A land pulverizer and mulcher including a pulverizer frame, two roller frames secured to the pulverizer frame, a guide tongue secured to the pulverizer frame, a roller supporting the roller frames, a mulcher shaft with mulchers thereon, and a mulcher frame comprising two arms supported on the mulcher shaft and adjustably connected pivotally to the roller frames respectively, the arms having standards thereon respectively and a broad weight-carrying plank supported by the standards and extending over and nearly covering all of the mulchers to variably load the mulchers.

2. A land pulverizer and mulcher including a pulverizer frame having two roller frames provided each with two guide bars on the rearward portion and a lug ear on the forward portion thereof, each lug ear having a pivot rigid thereon, a roller supporting the roller frames, a mulcher shaft with mulchers thereon, and a mulcher frame having two arms supported on the mulcher shaft and extending between the guide bars of the roller frames respectively, each arm having a plurality of pivot holes of which one receives one of the pivots on the lug ear whereby the arms are adjustably connected to vary their effective length to the lug ears respectively.

3. In a land pulverizer and mulcher, the combination with a main frame, of two roller frames secured to the main frame and having each a shaft housing, a roller mounted in the shaft housings, a mulcher rearward of the roller and having two arms extending above and forward of the shaft housings, each arm having a pivot hole adjacent to its end, two bushings loosely arranged in the pivot holes of the arms respectively, and two pivot bolts extending through the bushings respectively and securing the bushings rigidly to the roller frames respectively, the bolts having devices retaining the arms in connection with the bushings respectively.

4. In a land pulverizer and mulcher, the combination of a main frame with a draft tongue, two roller frames secured to the main frame and having each a housing, the forward portion of each roller frame having a lug ear and the rearward portion of the frame having a guide bar thereon, each guide bar having connection with the upper portion of the roller frame and also with the housing, two pivots connected to the lug ears respectively, a pulverizer shaft connected with the housings, pulverizer rollers on the pulverizer shaft and having each a circumferential rib thereon, a mulcher shaft, a plurality of mulcher wheels on the mulcher shaft, each mulcher wheel having a rim provided with laterally-staggered teeth, and two arms supported on the mulcher shaft and extending adjacent to and past the guide bar on the roller frames respectively and to the lug ears respectively, the arms having connection with the pivots respectively.

5. In a land pulverizer and mulcher, the combination of a main frame with a draft tongue, two roller frames secured to the main frame and having each a housing, the forward portion of each roller frame having a lug ear thereon, two pivots connected to the lug ears respectively, a pulverizer shaft connected with the housings, pulverizer rollers on the pulverizer shaft, a mulcher shaft, a plurality of mulcher wheels on the mulcher shaft and having each a rim provided with laterally-staggered teeth, two arms supported on the mulcher shaft and extending over the housings to the lug ears respectively the arms having connection with the pivots respectively. each arm having two standards spaced apart thereon with a seat bar connected at its ends to the standards, and a weight-carrying plank secured upon the seat bars to variably load the arms or to unload and permit them to be carried upon the housings respectively.

In testimony whereof I affix my signature in presence of two witnesses.

GAINFORD P. MIX.

Witnesses:
AMALIE BARING,
GEO. E. HORTON.